(12) United States Patent
Huang (10) Patent No.: US 11,567,376 B2
(45) Date of Patent: Jan. 31, 2023

(54) DISPLAY PANEL AND MANUFACTURING METHOD THEREOF

(71) Applicant: HKC Corporation Limited, Shenzhen (CN)

(72) Inventor: Bei Zhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 596 days.

(21) Appl. No.: 16/313,061

(22) PCT Filed: Dec. 12, 2017

(86) PCT No.: PCT/CN2017/115610
§ 371 (c)(1),
(2) Date: Dec. 24, 2018

(87) PCT Pub. No.: WO2019/085159
PCT Pub. Date: May 9, 2019

(65) Prior Publication Data
US 2021/0223640 A1 Jul. 22, 2021

(30) Foreign Application Priority Data
Nov. 3, 2017 (CN) .......................... 201711071337.1

(51) Int. Cl.
*G02F 1/1362* (2006.01)
*G02F 1/1335* (2006.01)
*G02F 1/1337* (2006.01)
*G02F 1/1368* (2006.01)

(52) U.S. Cl.
CPC .. *G02F 1/136209* (2013.01); *G02F 1/133512* (2013.01); *G02F 1/1368* (2013.01); *G02F 1/133723* (2013.01); *G02F 1/136231* (2021.01); *G02F 1/136286* (2013.01)

(58) Field of Classification Search
CPC ......... G02F 1/136209; G02F 1/133512; G02F 1/1368
See application file for complete search history.

(56) References Cited

U.S. PATENT DOCUMENTS

| | | | |
|---|---|---|---|
| 2015/0131025 A1* | 5/2015 | Ota | G02F 1/133512 349/110 |
| 2016/0041413 A1* | 2/2016 | Nishino | G02F 1/1339 349/42 |
| 2017/0227804 A1* | 8/2017 | Nagasawa | G02F 1/1339 |
| 2017/0336666 A1* | 11/2017 | Takasaki | G02F 1/133512 |
| 2019/0004378 A1* | 1/2019 | Chen | G02F 1/133723 |

* cited by examiner

*Primary Examiner* — Dung T Nguyen (57) ABSTRACT the present application provides a display panel and manufacturing method thereof, the display panel includes: a substrate, which comprises a first substrate and a second substrate arranged oppositely; a black matrix layer, formed on the first substrate; an alignment layer, formed on the black matrix layer and the second substrate; a color filter layer, formed on the first substrate or the second substrate; a liquid crystal layer, formed between the first substrate and the second substrate; and an active switch, formed on the substrate; where at least one groove is formed on the black matrix layer, a shading layer is formed on the position of the substrate corresponding to the groove, and the area of the substrate in which the groove is orthogonally projected is fully covered by the area of the substrate in which the shading layer is orthogonally projected.

14 Claims, 6 Drawing Sheets

DISPLAY PANEL AND MANUFACTURING METHOD THEREOF

TECHNICAL FIELD

The present application relates the field of display technologies, and particularly to a display panel and a manufacturing method thereof.

BACKGROUND

A display is generally controlled based on an active switch, which has many advantages, such as thin device body, power saving and radiation-free and thus are widely used. It mainly includes a liquid crystal display, an organic light-emitting diode (OLED) display, a quantum dot light emitting diodes (QLED) display, a plasma display, etc., and from the perspective of appearance and structure, includes a flat panel display and a curved surface display.

A liquid crystal display is comprised of two main parts: a liquid crystal panel and a backlight module. The liquid crystal display operates based on the following principle: liquid crystal molecules are placed between two parallel glass substrates and a driving voltage is applied on the two glass substrates to control the rotational directions of the liquid crystal molecules, such that a light is refracted out of the backlight module to generate an image.

An OLED display uses an organic light emitting diode (LED) for displaying, which has many advantages, such as self-illumination, wide viewing angle, almost infinitely high contrast, relative low power consumption, and very high response speed.

A QLED display has very similar structure to that of the OLED technology, with a main exception that the light emitting centers of the QLED are formed of materials of quantum dots. Its structure is that electrons and holes on both sides come together in the quantum dots layer to form an exciton, and thus a light is emitted by recombination of excitons.

With evolution of the market, people increasingly prefer to narrower bezel of the display, such that the polyimide (PI) liquid is apt to result in relative difficulty in the configuration of a displaying region and a frame sealing region, and the displaying performance and quality are significantly affected.

SUMMARY

An object of the present application is to provide a display panel that effectively improves displaying quality.

To address the above mentioned issues, an embodiment of the present application provides a display panel, which includes:

a display panel, the display panel includes:

a substrate, which includes a first substrate and a second substrate arranged oppositely;

a black matrix layer, formed on the first substrate;

an alignment layer, formed on the black matrix layer and the second substrate;

a color filter layer, formed on the first substrate or the second substrate;

a liquid crystal layer, formed between the first substrate and the second substrate; and an active switch, formed on the substrate;

where at least one groove is formed on the black matrix layer, a shading layer is formed on the position of the substrate corresponding to the groove, and the area of the substrate in which the groove is orthogonally projected is fully covered by the area of the substrate in which the shading layer is orthogonally projected.

Alternatively, the area of the substrate in which the shading layer is orthogonally projected is equivalent to the area of the substrate in which the groove is orthogonally projected. In this way, by configuring the area of the substrate in which the shading layer is orthogonally projected to be equivalent to that of the substrate in which the groove is orthogonally projected, the shading layer may use the same multi-tone mask as the groove, without requiring increase in development cost of the mask; the shading layer can be configured effectively corresponding to the groove in the black matrix layer, such that occurrence of light leakage at the groove of the black matrix layer is effectively prevented, and the phenomenon of uneven displaying or color mixing on the display panel may be effectively avoided, thereby perfectly guaranteeing the displaying performance of the display panel and further improving the displaying quality of the display panel.

Alternatively, the groove extends across the black matrix layer and the shading layer is formed on the bottom surface of the groove. In this way, by directly configuring the shading layer at the bottom of the groove, the manufacture procedure of configuring the shading layer may be simple and convenient for production and implement. As long as corresponding configuration is performed on the transverse groove, the occurrence of light leakage at the groove of the black matrix layer can effectively be avoided; and the outer side wall of the shading layer can tightly fit with the inner side wall of the groove, thereby effectively saving the material of the shading layer and further reducing production cost.

Alternatively, the active switch includes a gate layer, and the shading layer is produced by using the same material and process as the gate layer. In this way, it is made simple and convenient to configure the shading layer and choose material; and the manufacturing technology is sophisticated, no extra raw material is required, the costs in raw materials and material storage are reduced, and no new additional maternal is required in the BOM and it is convenient to perform the process management and purchasing; without requiring extra equipment that configures the shading layer, a set of equipment used may be shared with the gate layer, and no extra equipment and material is also required for subsequent etching period, thereby simplifying the production procedure of the display panel and further improving the production efficiency of the display panel.

Alternatively, the active switch includes a source layer and a drain layer, and the shading layer is produced by using the same material and manufacturing process as the source layer and the drain layer. In this way, the cost in developing new mask can be effectively reduced and it is made simple and convenient to choose material; and the manufacturing technology is sophisticated, no extra raw material is required, the costs in raw materials and material storage are reduced, and no new additional maternal is required in the BOM and it is convenient to perform the process management and purchasing; without requiring extra equipment that configures the shading layer, a set of equipment used may be shared with the source layer and drain layer, and no extra equipment and material is also required for subsequent etching period; meanwhile, as long as slight improvement is performed on the mask of the existing produced source layer and drain layer, the gate layer and the shading layer can be produced at the same time, further improving the production efficiency of the display panel.

Alternatively, a data line and a scanning line are formed on the substrate, and the shading layer is produced by using the same material and process as the data line and the scanning line. In this way, the configuration of the data line, the scanning line and the shading layer may be completed in one effort during the configuration of the data line and the scanning line, and thus it is made simple and convenient to configure the shading layer, the production procedure of the display panel can be well simplified and the production efficiency of the display panel can be further improved.

Alternatively, the groove includes a first groove configured in a first direction and a second groove configured in a second direction, where the first groove and the second groove are configured to intersect with each other. In this way, the intersection of the first groove and the second groove can effectively avoid accumulation of PI liquid, because the PI liquid may flow along the intersected grooves and fill up the grooves, thereby more effectively avoiding accumulation of PI liquid.

Alternatively, the grooves are shaped to be parallel bars. In this way, accumulation of the PI liquid is effectively avoided, such that coating of the PI liquid can be more uniform, the alignment layer formed by the PI liquid has relative uniform and consistent thickness and the influence of the alignment layer on the liquid crystal layer can be significantly reduced, thereby perfectly guaranteeing the displaying performance of the display panel and further improving the displaying quality of the display panel.

Alternatively, the grooves are configured to be blind grooves. In this way, by using the configuration of blind grooves, the PI liquid can be effectively avoided from leaking from the grooves to the substrate, good configuration of the alignment layer is perfectly guaranteed, thereby perfectly guaranteeing the displaying performance of the display panel and further improving the displaying quality of the display panel; additionally, because the configuration of the blink grooves has some effect of light shading, only a thin shading layer is required to be configured, in order to play good effect in shading light, and thus the thickness configured for the shading layer can be significantly reduced and the consumable materials for the shading layer are significantly saved.

Another object of the present application is to provide a manufacturing method of a display panel, which includes:

providing a first substrate and a second substrate;

forming a black matrix layer on the first substrate;

obtaining at least one groove on the black matrix layer by using multi-tone mask manufacture procedure;

forming an alignment layer on the black matrix layer and the second substrate;

forming a color filter layer on the first substrate;

forming a liquid crystal layer between the first substrate and the second substrate;

forming an active switch on the second substrate; and forming a shading layer on the position of the substrate corresponding to the groove, and the area of the substrate in which the groove is orthogonally projected is fully covered by the area of the substrate in which the shading layer is orthogonally projected.

In this way, the display panel obtained by using the above mentioned method can effectively avoid the occurrence of mura phenomenon during light-up of the display panel, that is, the phenomenon that the brightness on the display panel is uneven and various traces is caused. As a result, the display panel has better displaying performance, and thus the displaying quality of the display panel is significantly improved.

Another object of the present application is to provide a display device that effectively improve displaying quality.

A display device includes a control component and the display panel according to the present application.

In the present application, because the at least one groove is formed on the black matrix layer such that a polyimide (PI) liquid may flow back due to a retaining wall formed by a photo spacer during coating of the PI liquid and the back-flowed PI liquid enters into and fills up the groove, the accumulation of the PI liquid is effectively avoided, such that coating of the PI liquid can be more uniform, the alignment layer formed by the PI liquid has relative uniform and consistent thickness and the influence of the alignment layer on the liquid crystal layer can be significantly reduced, the occurrence of uneven brightness during light-up of the display panel and various resultant traces and spots is effectively avoided. As a result, the display panel has better displaying performance, and thus the displaying quality of the display panel is significantly improved. Because the black matrix layer in the groove is thin in thickness and even see-through, there is a risk of light leakage in the display panel. Accordingly, a shading layer is formed on the position of the substrate corresponding to the groove, the occurrence of light leakage at the groove in the black matrix layer can be effectively avoided. With the area of the substrate in which the groove is orthogonally projected being fully covered by the area of the substrate in which the shading layer is orthogonally projected, the occurrence of light leakage at the groove in the black matrix layer can be effectively prevented, and the phenomenon of uneven displaying or color mix in the display panel is effectively prevented, thereby perfectly guaranteeing the displaying performance of the display panel, further improving the displaying quality of the display panel and significantly raising the market competition of the display panel.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts.

In the accompanying drawings.

DETAILED DESCRIPTION

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms "first", "second" are merely for a descriptive purpose, and cannot to be understood to indicate or imply a relative importance, or implicitly indicate the number of the indicated technical features. Hence, the features defined by "first", "second" can explicitly or implicitly include one or more of the features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected, mechanically connected or coupled; or directly connected or indirectly connected through an intermediate medium, or in an internal communication between two elements. The specific meanings about the foregoing terms in the present application may be understood for those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

In the drawings, same numerals or characters are used to represent elements that are similar in structure throughout the various views.

Figure 1:
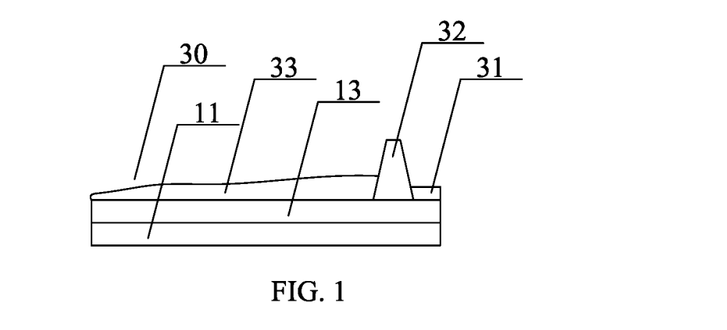
FIG. 1 is a partial schematic structural view of a display panel according to an embodiment of the present application.

As shown in FIG. 1, the inventor has designed a display panel which is not disclosed. The display panel includes a first substrate 11 and a second substrate. An alignment layer 14 is formed on the first substrate 11 and the substrate. The display panel consists of a displaying region 30 and a frame sealing region 31. A photo spacer (PS) 32 is provided between the first substrate 11 and the second substrate, and the photo spacer 32 is arranged between the displaying region 30 and the inside edge of the seal. The alignment layer 14 is formed on a black matrix layer 13 by coating with a layer of polyimide (PI) liquid on the surface of the black matrix layer. The PI liquid 33 is used to form a pretilt angle for facilitating the liquid crystals to have fixed backward directions during displaying. After the PI liquid 33 is subjected to rubbing action so as to cause the PI surface molecules to be arranged evenly to form the alignment layer 14. During coating of the PI liquid 33, because the positions of border frames in the display panel are designed for the seal, but the PI liquid can not be coated while overlapping the positions of the seal; otherwise, stripping or detachment may occur to the seal, resulting in the displaying abnormality of the display panel. The photo spacer 32 can effectively obstruct the coated PI liquid 33 and cause the PI liquid 33 to flow back and accumulate in the vicinity of the displaying region 30, so as to effectively avoid the occurrence of stripping or detachment of the seal that results in displaying abnormality of the display panel.

Further, the photo spacer 32 may be configured to be one or more rows to form a retaining wall for the PI liquid 33. The height of the retaining wall is more than 10 times the thickness of the PI liquid 33, so that the PI liquid 33 can be effectively obstructed and prevented from entering into the frame sealing region 31, thereby effectively guaranteeing the normal operation of the seal and further improving the displaying performance and displaying quality of the display panel.

The inventor has further researched and found that because the photo spacer 32 is configured to protrude to form the retaining wall for PI liquid, the PI liquid 33 may be caused to flow back and accumulate in the vicinity of the displaying region 30, so that after solidifying, the thickness of the alignment layer 14 may increase, and the liquid crystal layer having fixed backward direction during displaying may be influenced, resulting in the occurrence of displaying abnormality in the display panel.

The display panel, display device and manufacturing method for the display panel according to the present application will be described below in further detail with reference to FIG. 2 to FIG. 8.

Figure 2:
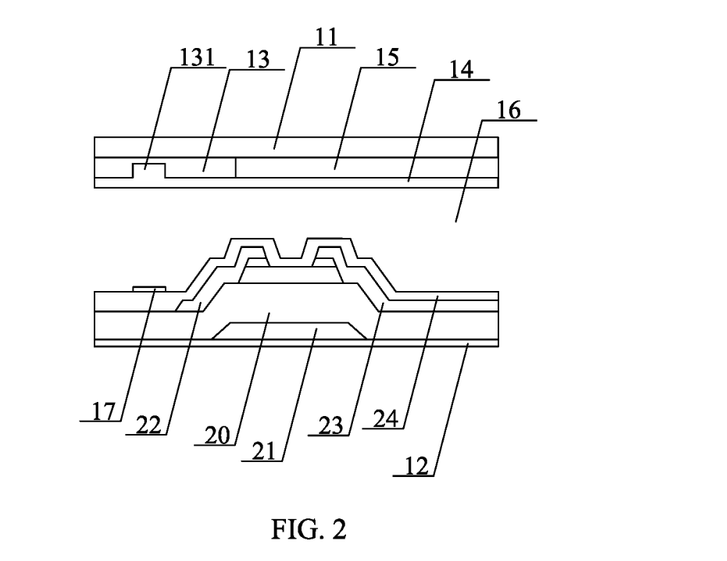
FIG. 2 is a partial schematic structural view of a display panel according to a further embodiment of the present application.
Figure 3:
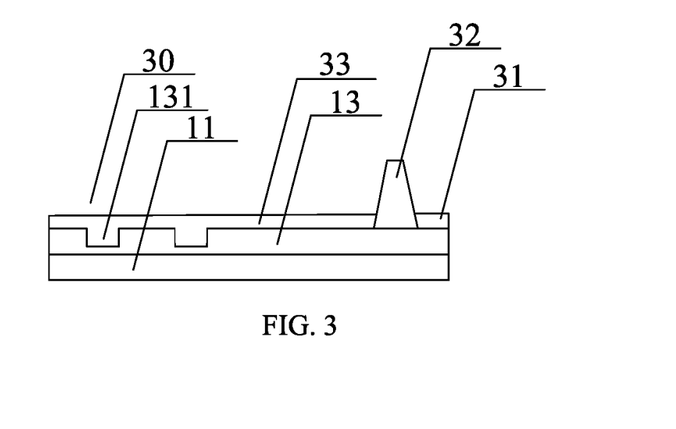
FIG. 3 is a partial schematic structural view of a display panel according to a further embodiment of the present application.

As shown in FIG. 2 and FIG. 3, the present application provides a display panel, the display panel includes:

a substrate, which includes a first substrate 11 and a second substrate 12 arranged oppositely;

a black matrix layer 13, formed on the first substrate 11;

an alignment layer 14, formed on the black matrix layer 13 and the second substrate 12;

a color filter layer 15, formed on the first substrate 11 or the second substrate 12;

a liquid crystal layer 16, formed between the first substrate 11 and the second substrate 12; and an active switch 20, formed on the substrate;

where at least one groove 131 is formed on the black matrix layer 13, a shading layer 17 is formed on the position of the substrate corresponding to the groove 131, and the area of the substrate in which the groove 131 is orthogonally projected is fully covered by the area of the substrate in which the shading layer 17 is orthogonally projected.

By forming the at least one groove 131 on the black matrix layer 13, the PI liquid is caused to flow back due to a retaining wall formed by a photo spacer during coating of the PI liquid and the back-flowed PI liquid enters into and fills up the groove 131, the accumulation of the PI liquid is effectively avoided, such that coating of the PI liquid can be more uniform, the alignment layer 14 formed by the PI liquid has relative uniform and consistent thickness and the influence of the alignment layer 14 on the liquid crystal layer 16 can be significantly reduced; the occurrence of uneven brightness during light-up of the display panel and various resultant traces and spots is effectively avoided. As a result, the display panel has better displaying performance, and thus the displaying quality of the display panel is significantly improved. Because the black matrix layer 13 in the groove 131 is thin in thickness and even see-through, there is a risk of light leakage in the display panel. Accordingly, a shading layer 17 is formed on the position of the substrate corresponding to the groove 131, the occurrence of light leakage at the groove 131 in the black matrix layer 13 can be effectively avoided. With the area of the substrate in which the groove 131 is orthogonally projected being fully covered by the area of the substrate in which the shading layer 17 is orthogonally projected, the occurrence of light leakage at the groove 131 in the black matrix layer 17 can be further prevented, and the phenomenon of uneven displaying or color mix in the display panel is effectively prevented, thereby perfectly guaranteeing the displaying performance of the display panel, further improving the displaying quality of the display panel and significantly raising the market competition of the display panel.

The color filter layer 15 may be formed on the first substrate 11 to form a color film (CF) substrate, the active switch 20 may be formed on the second substrate 12 to form an array substrate, and a layer of PI liquid is coated on the sides of the CF substrate and the array substrate to form pretilt angles for facilitating the liquid crystals to have fixed backward directions.

The amount of transmitted light is changed by changing the design of the black matrix layer 13. The black matrix layer 13 is produced by using a multi-tone mask, the multi-tone mask can be presented to be opaque to light, semi-transparent and full-transparent. After the black matrix layer 13 is subjected to exposure, development and dephotoresistor, the black matrix layer 13 is caused to form the groove 131 with different depths; the formed groove 131 of the black matrix layer 13 can obstruct the PI liquid, so that the PI liquid accumulates in the groove 131 of the black matrix layer 13 and is prevented from diffusing outward to the region other than the displaying region, such as the frame sealing region. The PI liquid can be effectively prevented from flowing back and accumulating in the vicinity of the displaying region, so as to effectively avoid the occurrence of stripping or detachment of the seal that results in displaying abnormality of the display panel; the multi-tone mask is used to cause the black matrix layer 13 to form the groove 131, without requiring addition of manufacturing process and increase in mask cost.

The area of the substrate in which the shading layer 17 is orthogonally projected is equivalent to that of the substrate in which the groove 131 is orthogonally projected. By configuring the area of the substrate in which the shading layer 17 is orthogonally projected to be equivalent to that of the substrate in which the groove 131 is orthogonally projected, the shading layer 17 may use the same multi-tone mask as the groove 131, without requiring increase in development cost of the mask; the shading layer 17 can be configured effectively corresponding to the groove in the black matrix layer 13, such that occurrence of light leakage at the groove 131 of the black matrix layer 13 is further prevented, and the phenomenon of uneven displaying or color mixing on the display panel may be effectively avoided, thereby perfectly guaranteeing the displaying performance of the display panel and further improving the displaying quality of the display panel. Furthermore, with the same multi-tone mask being used, the area of the substrate in which the shading layer 17 is orthogonally projected is identical to the area of the substrate in which the groove 131 is orthogonally projected. Not only the occurrence of light leakage at the groove 131 of the black matrix layer 13 can be effectively avoided, but also the material for the shading layer 17 can be significantly saved, thereby further reducing production cost and significantly raising the market competition of the display panel.

Figure 4:
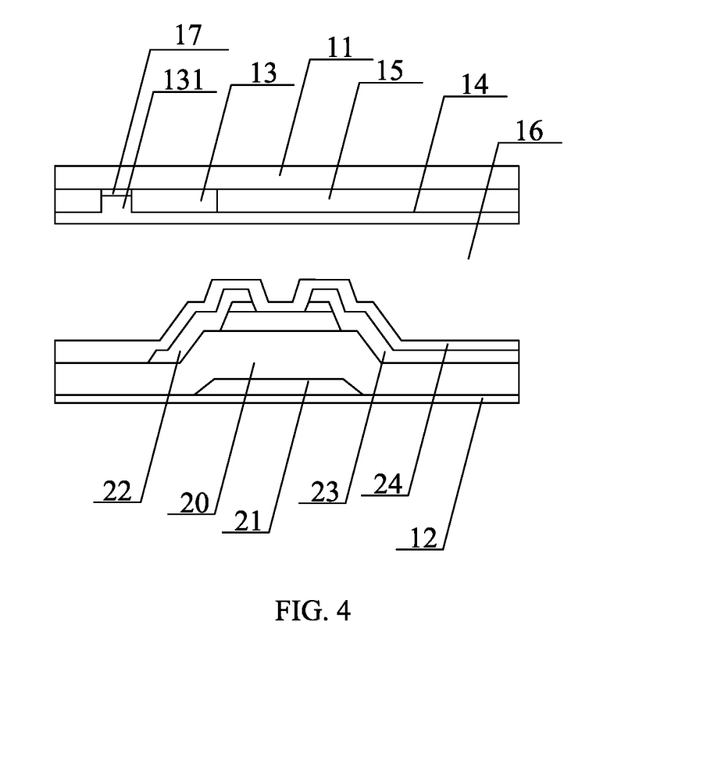
FIG. 4 is a partial schematic structural view of a display panel according to a further embodiment of the present application.

As shown in FIG. 4, the groove 131 extends across the black matrix layer 13, and the shading layer 17 is arranged at the bottom of the groove 131. By directly configuring the shading layer 17 at the bottom of the groove 131, the manufacture procedure of configuring the shading layer 17 may be simple and convenient for production and implement. As long as corresponding configuration is performed on the transverse groove 131, the occurrence of light leakage at the groove 131 of the black matrix layer 13 can effectively be avoided; and the outer side wall of the shading layer 17 can tightly fit with the inner side wall of the groove 131, thereby effectively saving the material of the shading layer 17 and further reducing production cost.

Figure 5:
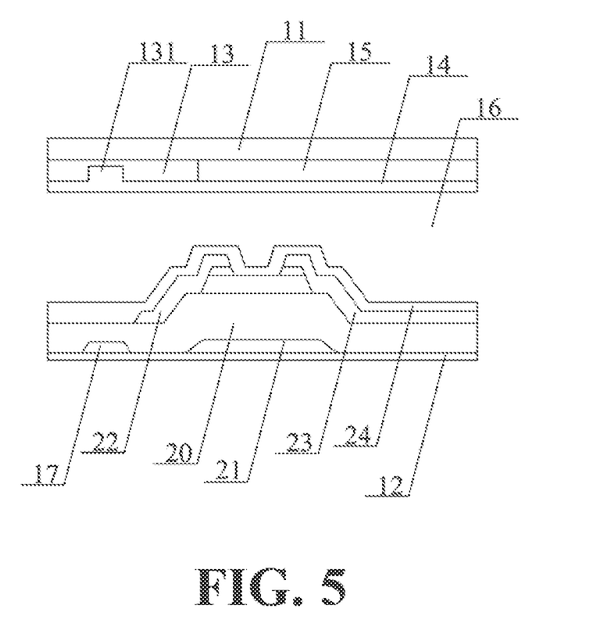
FIG. 5 is a partial schematic structural view of a display panel according to a further embodiment of the present application.

As shown in FIG. 5, the active switch 20 includes a gate layer 21, and the shading layer 17 is produced by using the same material and process as the gate layer 21. When the gate layer 21 is formed, the gate layer 21 and the shading layer 17 may be formed in one effort by combining with a half tone mask or a gray-tone mask. As a result, it is made simple and convenient to configure the shading layer and choose material; and the manufacturing technology is sophisticated, no extra raw material is required, the costs in raw materials and material storage are reduced, and no new additional maternal is required in the BOM and it is convenient to perform the process management and purchasing; without requiring extra equipment that configures the shading layer 17, a set of equipment used may be shared with the gate layer 21, and no extra equipment and material is also required for subsequent etching period, thereby simplifying the production procedure of the display panel and further improving the production efficiency of the display panel. Furthermore, the same material and process as the gate layer 21 is used, the cost in developing new mask may be significantly reduced. As long as slight improvement is performed on the mask of the existing produced gate layer 21, the masks of the gate layer 21 and the shading layer 17 can be produced at the same time, thereby further improving the production efficiency of the display panel. By controlling the shape of the mask and the exposure time, the thickness and shape of the shading layer 17 can be effectively controlled, thereby guaranteeing that the shading layer 17 is capable of providing effective light shading performance, further eliminating the phenomenon that brightness on the display panel is uneven during light-up of the display panel and various traces is caused.

Figure 6:
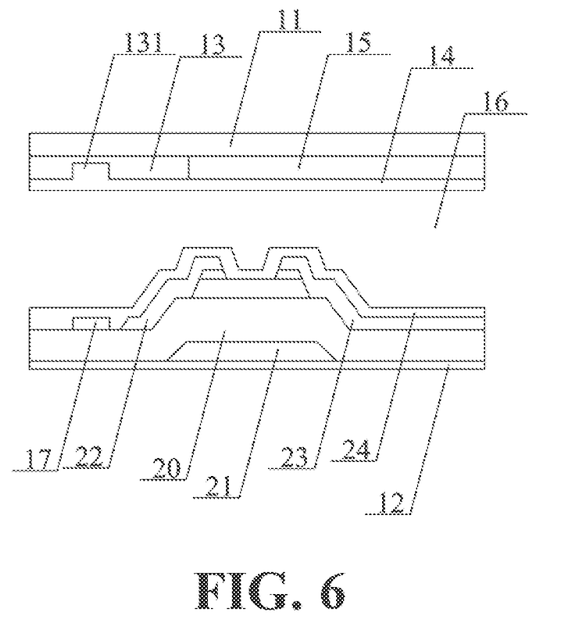
FIG. 6 is a partial schematic structural view of a display panel according to a further embodiment of the present application.

As shown in FIG. 6, the active switch 20 includes a source layer 22 and a drain layer 23, and the shading layer 17 is produced by using the same material and process as the source layer 22 and the drain layer 23. When the source layer 22 and the drain layer 23 are formed, the source layer 22, the drain layer 23 and the shading layer 17 may be formed in one effort by combining with a multi-tone mask. As a result, it is made simple and convenient to configure the shading layer 17, thereby significantly simplifying the production procedure of the display panel and further improving the production efficiency of the display panel. Furthermore, the same material and process as the source layer 22 and the drain layer 23 is used, the cost in developing new mask can be effectively reduced and it is made simple and convenient to choose material; and the manufacturing technology is sophisticated, no extra raw material is required, the costs in raw materials and material storage are reduced, and no new additional maternal is required in the BOM and it is convenient to perform the process management and purchasing; without requiring extra equipment that configures the shading layer 17, a set of equipment used may be shared with the source layer 22 and drain layer 23, and no extra equipment and material is also required for subsequent etching period; meanwhile, as long as slight improvement is performed on the mask of the existing produced source layer 22 and drain layer 23, the source layer 22, the drain layer 23 and the shading layer 17 can be produced at the same time, further improving the production efficiency of the display panel. By controlling the shape of the mask and the exposure time, the thickness and shape of the shading layer 17 can be effectively controlled, thereby guaranteeing that the shading layer 17 is capable of providing effective light shading performance, further eliminating the phenomenon that brightness on the display panel is uneven during light-up of the display panel and various traces is caused. The source layer 22 and the drain layer 23 are made of metal material, and from the view of micro-structure, there may be metal burr on the side edges of the source layer 22 and the drain layer 23. The metal burr on the source layer 22 and the drain layer 23 can be properly covered by two protective layers 24 on the source layer 22 and the drain layer 23, the metal burr is quite effectively prevented from being exposed outside the protective layers 24, such that the source layer 22 and the drain layer 23 can be properly protected by the protective layers 24 and thus the influence of subsequent manufacture procedure on the source layer 22 and the drain layer 23 is effectively avoided, thereby perfectly improving the yield of the display panel.

A data line and a scanning line are formed on the substrate, and the shading layer 17 is produced by using the same material and process as the data line and the scanning line. The configuration of the data line, the scanning line and the shading layer may be completed in one effort during the configuration of the data line and the scanning line, and thus it is made simple and convenient to configure the shading layer 17, the production procedure of the display panel can be well simplified and the production efficiency of the display panel can be further improved. Furthermore, the same material and process as the data line and the scanning line is used, the cost in developing new mask can be effectively reduced and it is made simple and convenient to choose material; and the manufacturing technology is sophisticated, no extra raw material is required, the costs in raw materials and material storage are reduced, and no new additional maternal is required in the BOM and it is convenient to perform the process management and purchasing; without requiring extra equipment that configures the shading layer 17, a set of equipment used may be shared with the data line and scanning line, and no extra equipment and material is also required for subsequent etching period, meanwhile, as long as slight improvement is performed on the mask of the existing produced data line and scanning line, the data line, the scanning line and the shading layer 17 can be produced at the same time, further improving the production efficiency of the display panel. By controlling the shape of the mask and the exposure time, the thickness and shape of the shading layer 17 can be effectively controlled, thereby guaranteeing that the shading layer 17 is capable of providing effective light shading performance, further eliminating the phenomenon that brightness on the display panel is uneven during light-up of the display panel and various traces is caused.

The groove 131 includes a first groove configured in a first direction and a second groove configured in a second direction, where the first groove and the second groove are configured to intersect with each other. With the black matrix layer 13 being produced by using the process for Cross-shaped half-tone mask or gray-tone mask to effectively form grooves on the black matrix layer 13, the accumulation of the PI liquid is effectively avoided, such that coating of the PI liquid can be more uniform, the alignment layer 14 formed by the PI liquid has relative uniform and consistent thickness and the influence of the alignment layer 14 on the liquid crystal layer 16 is significantly reduced, the occurrence of mura phenomenon during light-up of the display panel is effectively avoided; due to the intersection between the first groove and the second groove, the accumulation of the PI liquid can be effectively avoided, the PI liquid may flow along the intersected grooves 131 and fill up the grooves 131, thereby effectively avoiding the accumulation of the PI liquid.

The grooves 131 are shaped to be parallel bars. With the black matrix layer 13 being produced by using the process for Slit-shaped half-tone mask or gray-tone mask to effectively form grooves 131 on the black matrix layer 13, the accumulation of the PI liquid is effectively avoided, such that coating of the PI liquid is more uniform, the alignment layer 14 formed by the PI liquid has relative uniform and consistent thickness and the influence of the alignment layer 14 on the liquid crystal layer 16 is significantly reduced, the occurrence of mura phenomenon during light-up of the display panel is effectively avoided, thereby perfectly guaranteeing the displaying performance of the display panel, further improving the displaying quality of the display panel and significantly raising market competition of the display panel; multiple parallel grooves can effectively avoid the accumulation of the PI liquid.

The grooves 131 are blind grooves. With the configuration of the blind grooves, the PI liquid can be effectively avoided from leaking from the grooves 131 to the substrate, good configuration of the alignment layer 14 is perfectly guaranteed, thereby perfectly guaranteeing the displaying performance of the display panel and further improving the displaying quality of the display panel; additionally, because the configuration of the blink grooves has some effect of light shading, only a thin shading layer 17 is required to be configured, in order to play good effect in shading light, and thus the thickness configured for the shading layer 17 can be significantly reduced and the consumable materials for the shading layer 17 are significantly saved.

In the above descried embodiments, the material for the substrate may be selected from glass, plastic transparent materials or the like.

In the above described embodiments, taking a liquid crystal panel as an example, the liquid crystal panel includes an array substrate and a color film (CF) substrate, where the array substrate and CF substrate are arranged oppositely, the liquid crystals and the photo spacer 32 are formed between the array substrate and CF substrate. An active switch 20, such as a thin film transistor (TFT), is formed on the array substrate, a color filer layer 15 is formed on the CF substrate, and the color filter layer 15 and the active switch 20 may be formed on the same substrate.

Figure 7:
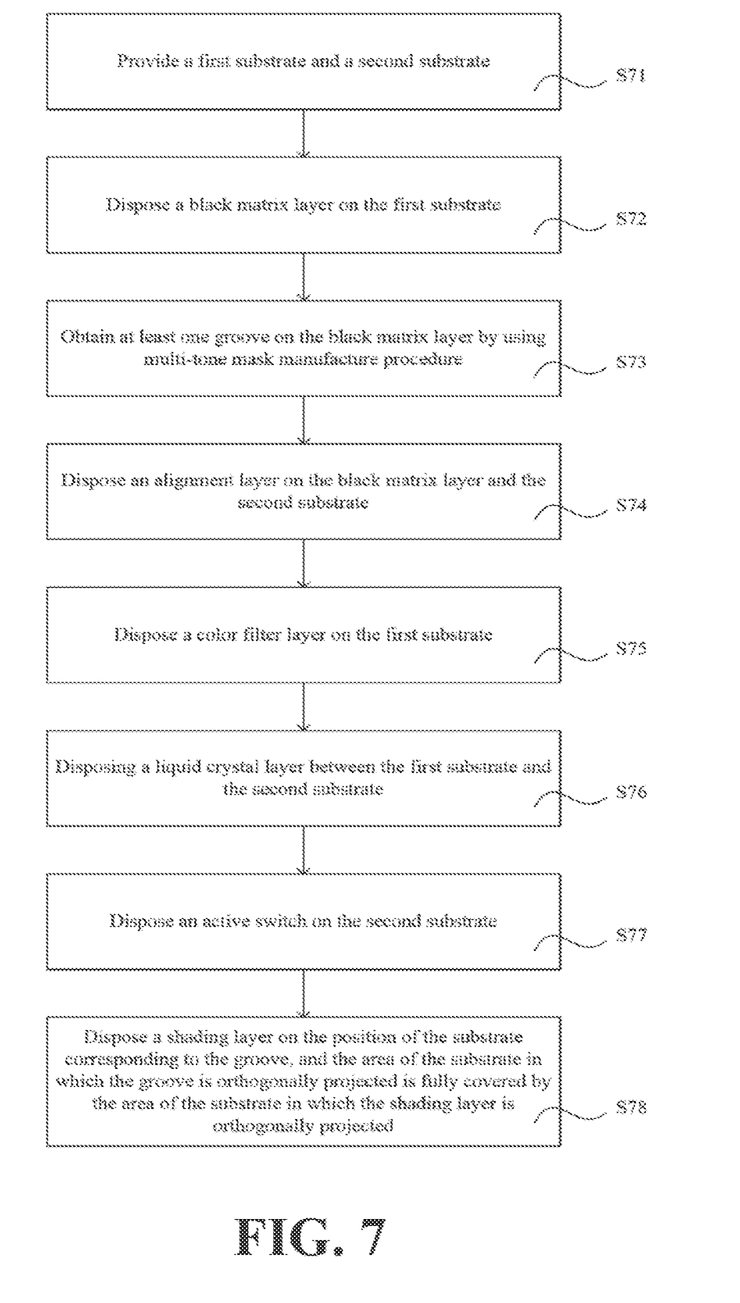
FIG. 7 is a partial schematic structural view of a manufacturing method for a display panel according to a further embodiment of the present application.

Referring to FIG. 7, an embodiment of the present application provides a manufacturing method for a display panel, which includes:

S71: Provide a first substrate and a second substrate.

S72: Form a black matrix layer on the first substrate.

S73: Obtain at least one groove on the black matrix layer by using multi-tone mask manufacture procedure.

S74: Form an alignment layer on the black matrix layer and the second substrate.

S75: Form a color filter layer on the first substrate.

S76: Form a liquid crystal layer between the first substrate and the second substrate.

S77: Form an active switch on the second substrate.

S78: Form a shading layer on the position of the substrate corresponding to the groove, and the area of the substrate in which the groove is orthogonally projected is fully covered by the area of the substrate in which the shading layer is orthogonally projected.

With the at least one groove 131 being formed on the black matrix layer 13 such that a polyimide (PI) liquid flows back due to a retaining wall formed by a photo spacer during coating of the PI liquid and the back-flowed PI liquid enters into and fills up the groove, the accumulation of the PI liquid is effectively avoided, such that coating of the PI liquid is more uniform, the alignment layer 14 formed by the PI liquid has relative uniform and consistent thickness and the influence of the alignment layer 14 on the liquid crystal layer 16 is significantly reduced; the occurrence of mura during light-up of the display panel, that is uneven brightness on the display panel and various resultant traces and spots is effectively avoided. As a result, the display panel has better displaying performance, and thus the displaying quality of the display panel is significantly improved.

In the above described embodiments, the display panel includes a liquid crystal panel, an organic light-emitting diode (OLED) panel, a quantum dot light emitting diodes (QLED) panel, a plasma panel, a flat panel and a curved surface panel, and no limitation is made thereto.

Figure 8:
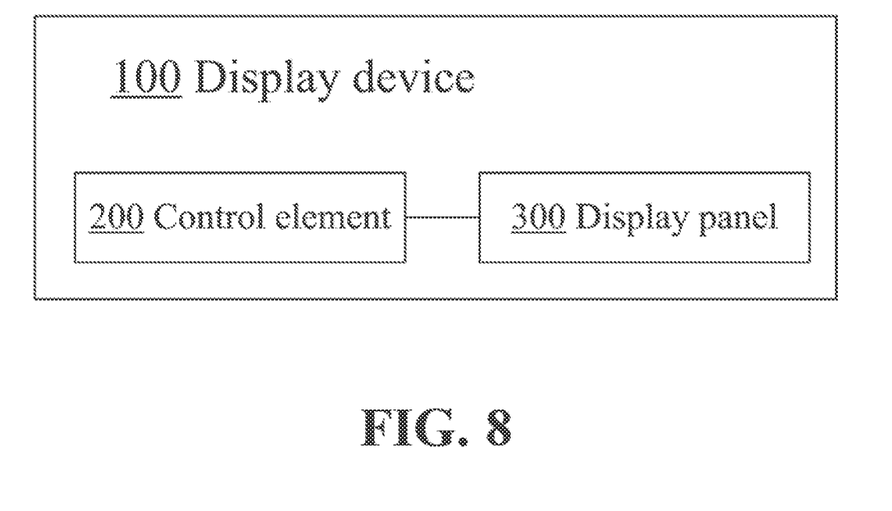
FIG. 8 is a schematic diagram of a display device according to the present application.

Referring to FIG. 8, this embodiment provides a display device 100. The display device 100 includes a control element 200 and the display panel 300 according to this application. The display panel is taken as an example in the detailed description, it should be noted that the description for the structure of the display panel is applicable to the display device according to the present application. When the display device according to the present embodiment is a liquid crystal display, the liquid crystal display includes a backlight module. The backlight module may be used as a light source, for supplying sufficient brightness and a evenly distributed light source. The backlight module according to the present application may be of front light type or back light type. It should be noted that the backlight module according to the present application is not limited thereto.

In the above description, the present application is described in a further detail with reference to alternative embodiments, and should not be considered limiting specific embodiments of the present application to the descriptions. Those of ordinary skill in the art the present invention belongs, without departing from the concepts of the present application, can make various simple deductions or substitutions, which should be deemed to belong to the protective scope of the present application.

What is claimed is:

1. A display panel, comprising:
   a substrate, comprising a first substrate and a second substrate arranged opposite to the first substrate;
   a black matrix layer, formed on the first substrate;
   an alignment layer, formed on each of the black matrix layer and the second substrate;
   a color filter layer, formed on the first substrate or the second substrate;
   a liquid crystal layer, formed between the first substrate and the second substrate; and
   an active switch, formed on the second substrate;
   wherein at least one groove is defined in the black matrix layer and is located in a displaying region of the display panel, a shading layer is formed on a position of the first or the second substrate corresponding to the at least one groove and is configured to prevent light leakage at the at least one groove in the black matrix layer, and wherein an area of an orthogonal projection of the at least one groove onto the first substrate is fully covered by an area of an orthogonal projection of the shading layer onto the first substrate;
   wherein during a coating process of the alignment layer in liquid form, the alignment layer is caused to flow back due to a retaining wall formed by a photo spacer and the back-flowed alignment layer enters and fills up the at least one groove;
   wherein the at least one groove goes through an entire thickness of the black matrix layer and wherein the shading layer is formed on a bottom surface of the at least one groove, and wherein the shading layer has a thickness less than a depth of the at least one groove.

2. The display panel according to claim 1, wherein the area of the orthogonal projection of the shading layer onto the first substrate is equal to the area of the orthogonal projection of the at least one groove onto the first substrate.

3. The display panel according to claim 1, wherein the active switch comprises a gate layer, and the shading layer is made of a same material and in a same process as the gate layer.

4. The display panel according to claim 1, wherein the active switch comprises a source layer and a drain layer, and the shading layer is made of a same material and in a same process as the source layer and drain layer.

5. The display panel according to claim 1, wherein a data line and a scanning line are formed on the substrate, and the shading layer is made of a same material and in a same process as the data line and the scanning line.

6. The display panel according to claim 1, wherein the at least one groove comprises a plurality of grooves configured as parallel bars.

7. The display panel according to claim 1, wherein an outer sidewall of the shading layer is tightly fitted with an inner sidewall of the at least one groove.

8. The display panel according to claim 1, wherein the retaining wall has a height that is more than 10 times a thickness of the liquid alignment layer.

9. The display panel according to claim 1, wherein the photo spacer is arranged between the displaying region and an inner edge of a seal.

10. A manufacturing method of a display panel, comprising:
    providing a first substrate and a second substrate;
    forming a black matrix layer on the first substrate;
    creating at least one groove in the black matrix layer by using a multi-tone mask manufacture procedure, wherein the at least one groove is located in a displaying region of the display panel;
    forming an alignment layer on each of the black matrix layer and the second substrate;
    forming a color filter layer on the first substrate;

forming a liquid crystal layer between the first substrate and the second substrate;

forming an active switch on the second substrate; and forming a shading layer on a position of the first or the second substrate corresponding to the at least one groove, and wherein an area of an orthogonal projection of the at least one groove onto the first substrate is fully covered by an area of an orthogonal projection of the shading layer onto the first substrate, wherein the shading layer is configured to prevent light leakage at the at least one groove in the black matrix layer;

wherein during a coating process of the alignment layer in liquid form, the alignment layer is caused to flow back due to a retaining wall formed by a photo-spacer and the back-flowed alignment layer enters and fills up the at least one groove;

wherein the at least one groove goes through an entire thickness of the black matrix layer and the shading layer is formed on a bottom surface of the at least one groove, and wherein the shading layer has a thickness less than a depth of the at least one groove.

11. The manufacturing method of the display panel according to claim 10, wherein the area of the orthogonal projection of the shading layer onto the first substrate is equal to the area of the orthogonal projection of the at least one groove onto the first substrate.

12. The manufacturing method of the display panel according to claim 10, wherein the active switch comprises a gate layer, and the shading layer is made of a same material and in a same process as the gate layer.

13. The manufacturing method of the display panel according to claim 10, wherein the active switch comprises a source layer and a drain layer, and the shading layer is made of a same material and in a same process as the source layer and drain layer.

14. The manufacturing method of the display panel according to claim 10, wherein a data line and a scanning line are formed on the substrate, and the shading layer is made of a same material and in a same process as the data line and the scanning line.

* * * * *